United States Patent
Favalora

(10) Patent No.: US 11,009,770 B2
(45) Date of Patent: May 18, 2021

(54) LIGHT FIELD GENERATION SYSTEM INCLUDING DIRECTIONALLY-SENSITIVE OPTICAL ELEMENT FOR IMPROVED CONTRAST

(71) Applicant: The Charles Stark Draper Laboratory, Inc., Cambridge, MA (US)

(72) Inventor: Gregg E. Favalora, Bedford, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 16/540,650

(22) Filed: Aug. 14, 2019

(65) Prior Publication Data

US 2020/0057355 A1 Feb. 20, 2020

Related U.S. Application Data

(60) Provisional application No. 62/718,802, filed on Aug. 14, 2018.

(51) Int. Cl.
*G02F 1/335* (2006.01)

(52) U.S. Cl.
CPC ........ *G02F 1/335* (2013.01); *G02F 2201/302* (2013.01); *G02F 2203/22* (2013.01)

(58) Field of Classification Search
None
See application file for complete search history.

(56) References Cited

U.S. PATENT DOCUMENTS

2009/0141116 A1* 6/2009 Kanade ................. H04N 7/144
348/14.01

OTHER PUBLICATIONS

Hinkov, V.P., et al., "Collinear Acoustooptical TM-TE Mode Conversion in Proton Exchanged Ti:LiNbO3 Waveguide Structures," J. Lightwave Tech., 6(6): 900-908 (1988).
McLaughlin, S., et al., "Optimized guided-to-leaky-mode device for graphics processing unit controlled frequency division of color," Appl. Opt., 54(12): 3732-3736 (2015).
Qaderi, K., et al., "Leaky-mode waveguide modulators with high deflection angle for use in holographic video displays," Opt. Expr., 24(18): 20831-20841 (2016).
Savidis, N., et al., "Progress in fabrication of waveguide spatial light modulators via femtosecond laser micromachining," Proc. of SPIE, 10115 (2017).
Smalley, D.E., et al., "Anisotropic leaky-mode modulator for holographic video displays," Nature, 498: 313-317 (2013).

(Continued)

*Primary Examiner* — Jerry Rahll
(74) *Attorney, Agent, or Firm* — HoustonHogle LLP

(57) ABSTRACT

A light field generation system includes a two dimensional emitter array for projecting light and a directionally-sensitive optical element in front of the emitter array but before a directional diffuser. Certain classes of emitters are intended to project information principally along one axis (e.g. amplitude modulated in the horizontal plane, i.e. so that each eye sees a potentially different image) and are the basis of horizontal-parallax-only (HPO) displays. Examples include surface acoustic wave (SAW) modulators, such as edge-emitting or surface-emitting modulators. They often project undesired or stray light along directions along a different axis (e.g. vertically) and the diffuser will also spread the visibility of the stray light field components. Thus, the directionally-sensitive optical element will improve contrast in this scenario.

20 Claims, 17 Drawing Sheets

(56) References Cited

OTHER PUBLICATIONS

St. Hilaire, P., "Scalable optical architecture for electronic holography," Optical Engineering, 34(10): 2900-2911 (section 6.6.2) (1995).
De Bitetto, D.J., "Bandwidth reduction of hologram transmission systems by elimination of vertical parallax," Applied Physics Letters, 12(5): 176-178 (1968).
Yoshida, S., et al., "The 'Trinitron'—A New Color Tube," IEEE Trans. Consumer Electron., CE-28(1): 56-64 (1982).

* cited by examiner

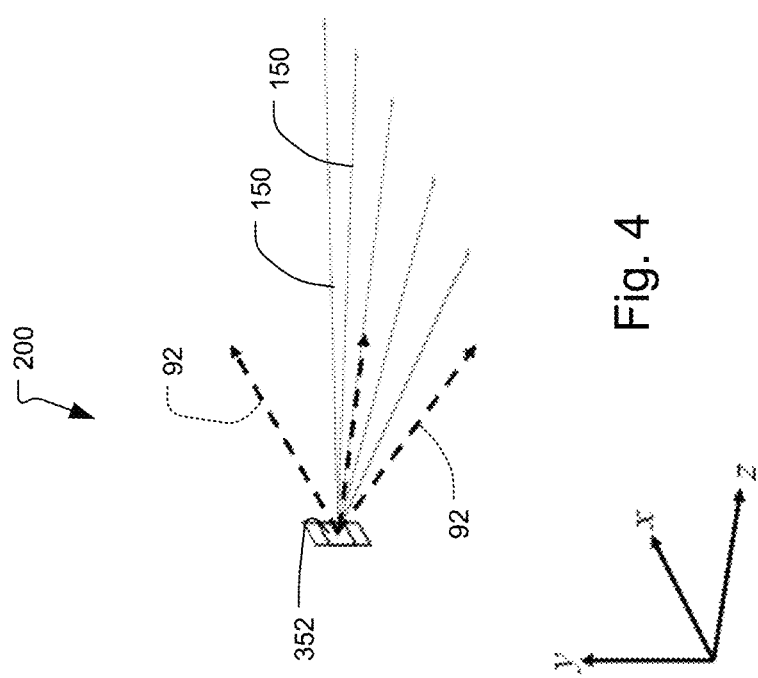

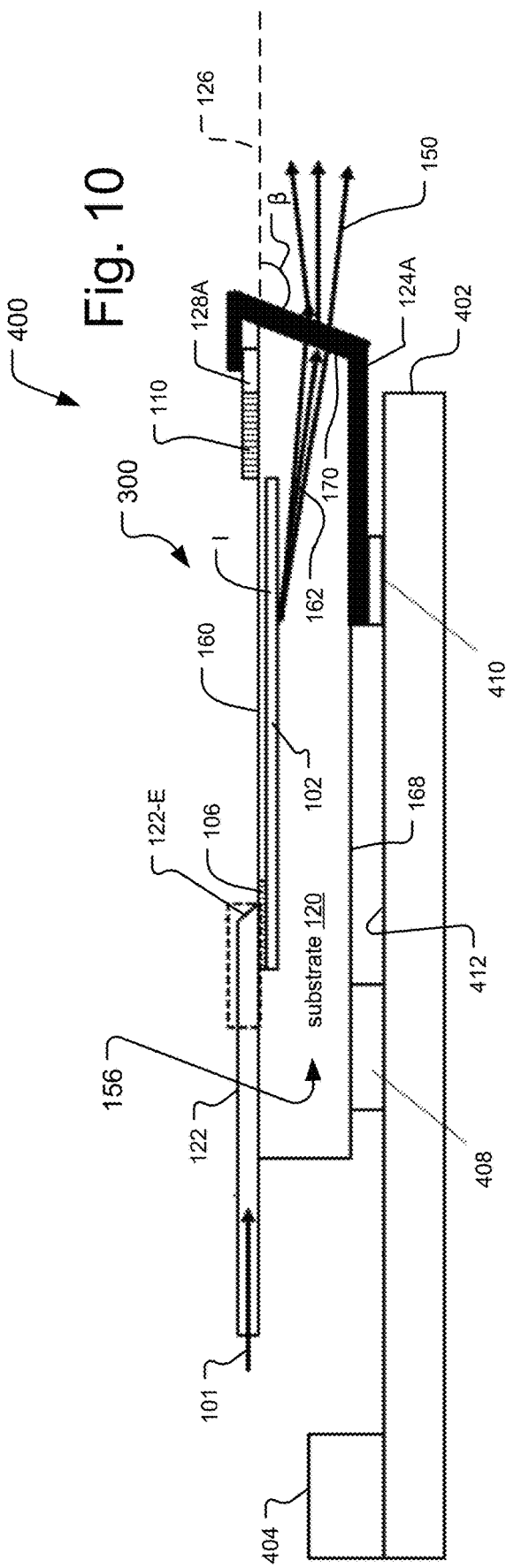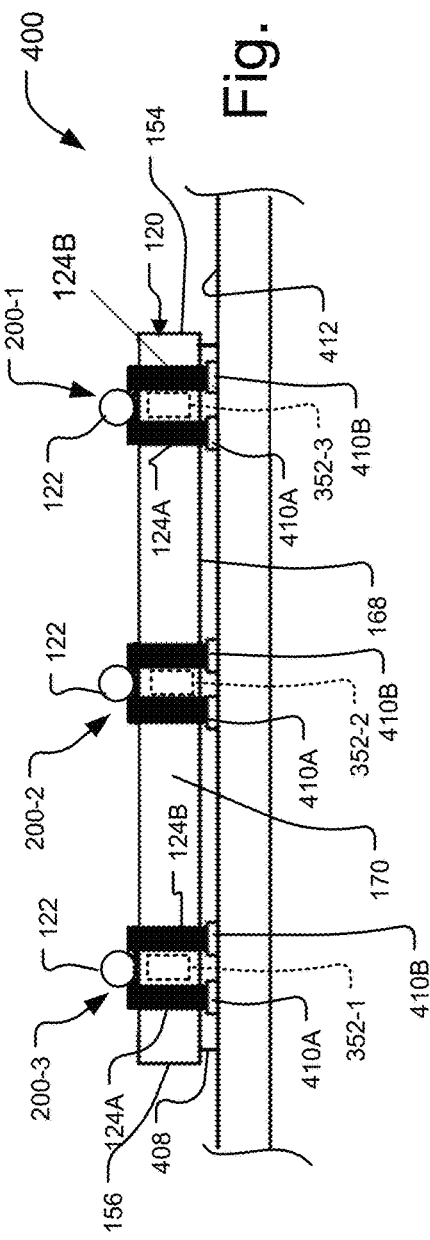

LIGHT FIELD GENERATION SYSTEM INCLUDING DIRECTIONALLY-SENSITIVE OPTICAL ELEMENT FOR IMPROVED CONTRAST

RELATED APPLICATIONS

This application claims the benefit under 35 USC 119(e) of U.S. Provisional Application No. 62/718,802, filed on Aug. 14, 2018, which is incorporated herein by reference in its entirety.

BACKGROUND OF THE INVENTION

Surface acoustic wave (SAW) optical modulator systems are being proposed as an optical engine for three dimensional (3D) display systems. These modulators function as emitters to provide controllable sub-holograms from which a light field can be constructed.

One type of SAW modulator is the guided-to-leaky-mode device fabricated using lithium niobate as described, for example, in Hinkov et al., *Collinear Acoustooptical TM-TE Mode Conversion in Proton Exchanged Ti:LiNbO3 Waveguide Structures*, J. Lightwave Tech., vol. 6(6), pp. 900-08 (1988), Smalley et al., Anisotropic leaky-mode modulator for holographic video displays, Nature, vol. 498, pp. 313-317 (2013), herein after "Smalley"; McLaughlin et al., *Optimized guided-to-leaky-mode device for graphics processing unit controlled frequency division of color*, Appl. Opt., vol. 54(12), pp. 3732-36 (2015), Qaderi et al., *Leaky-mode waveguide modulators with high deflection angle for use in holographic video displays*, Opt. Expr., vol. 24(18), pp. 20831-41 (2016), hereinafter "Qaderi"; and Savidis et al., *Progress in fabrication of waveguide spatial light modulators via femtosecond laser micromachining*, Proc. of SPIE Vol. 10115, 2017.

In these SAW modulators, a surface acoustic wave diffracts light propagating in a waveguide and causes at least some of the light to change from a guided mode to a leaky mode that exits the waveguide.

In SAW modulator-based three dimensional (3D) displays and more generally light field projection systems, often many hundreds or more of the SAW modulators must be integrated together to construct the desired smooth light field.

Such light field projection systems will tend to operate principally in one axis, and commonly provide horizontal-parallax-only (HPO). Each SAW modulator emitter projects information principally along one axis (e.g. amplitude modulated in the horizontal plane, i.e. so that each eye sees a potentially different image). The systems will typically employ a directional diffuser at the hologram plane in order to significantly broaden the (for example) vertical extent of the system's exit pupil. This intentional "discarding" of one axis of perspective was a critical advance in print display holography and electronic display holography because of various, still-relevant, technical barriers to full parallax holography. For example, see:

De Bitetto, D. J., "Bandwidth reduction of hologram transmission systems by elimination of vertical parallax," Applied Physics Letters, Vol. 12, No. 5, 176-178 (March 1968).

St. Hilaire, P., "Scalable optical architecture for electronic holography," Optical Engineering, Vol. 34, No. 10, 2900-2911 (section 6.6.2) (October 1995).

SUMMARY OF THE INVENTION

The SAW modulators may also project undesired spurious or stray light along directions along a different axis (e.g. vertically). Thus, HPO systems' directional diffuser will also spread the visibility of the straylight field components.

Therefore, it would be desirable to associate a directionally-sensitive optical element, such as an aperture grille, with the directional diffuser. This optical element functions as a single axis collimating element or a single axis shadow mask element to block stray light along one of the two axes of the display and in this way mask stray light from the diffuser.

In general, according to one aspect, the invention features a light field generation system, which includes a two dimensional emitter array for projecting light and a directionally-sensitive optical element in front of the emitter array.

Typically, the system further includes a directional diffuser after the directionally-sensitive optical element. Also, the invention would typically be applied to a horizontal parallax only system.

In current implementations, the two dimensional emitter array comprises a two dimensional array of surface acoustic wave (SAW) modulators. These could be edge-emitting or surface-emitting modulators.

The directionally-sensitive optical element might be implemented as an aperture grille. The pitch between apertures of the aperture grille would match a pitch between rows of emitters of the emitter array.

Other examples include microlouver material, arrays of diffractive optical elements, a reflective element, or a holographic optical element.

In general, according to one aspect, the invention features a method for improving contrast in a light field generation system. This comprises projecting light with a two dimensional emitter array and blocking stray light with a directionally-sensitive optical element in front of the emitter array.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 4 is a schematic perspective view showing the light emitted from a SAW emitter or pixel;

FIG. 10 is a side view of the projector module showing one of the light field generator devices, further showing the light propagating through one if its edge-emitting SAW modulators and exiting from the device;

FIG. 11 is a partial front view of the projector module 400 showing the routing of RF feeds to the SAW transducers of a light field generator device;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

It will be understood that although terms such as "first" and "second" are used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
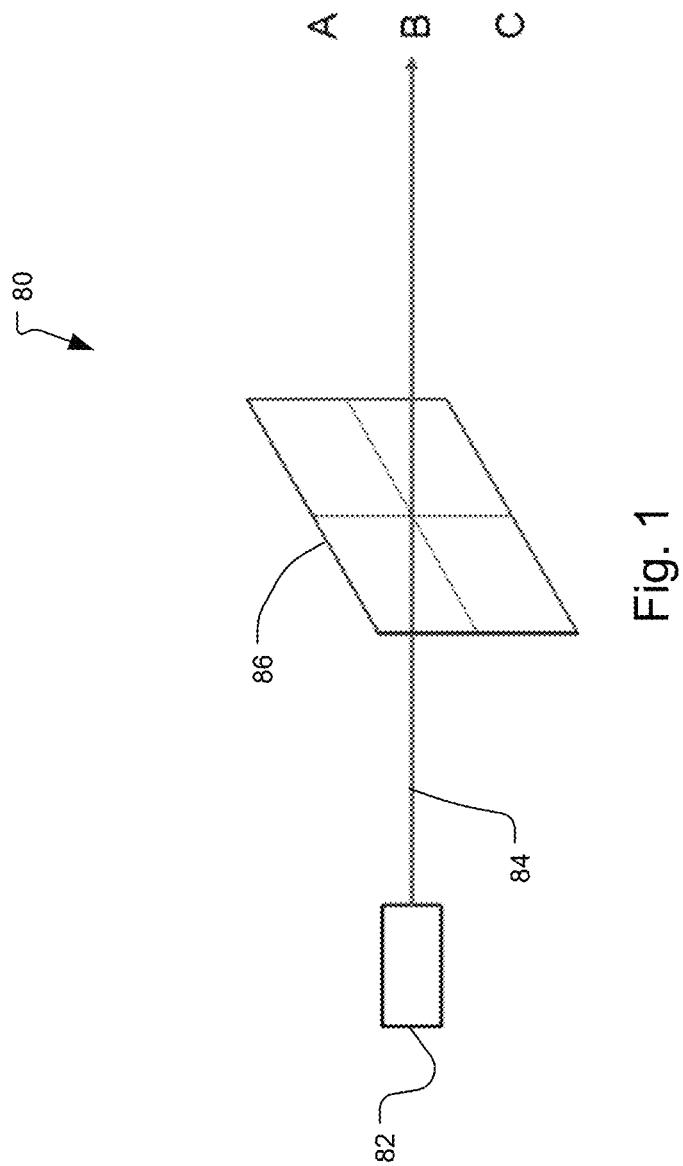
FIG. 1 is a schematic perspective view showing a ray of light in the absence of a diffuser in the operation of a light field projection system.

FIG. 1 illustrates the need for the diffuser in the typical light field projection system 80.

It shows a single light source 82 directing a collimated beam 84 of light through a display surface 86 towards an observer. Because no diffuser is present to increase the divergence of the light, the light is only visible at location "B" and not at location "A" or "C." That is, with the exception of background light emitted from 82 in undesirable directions, the light 84 is only visible at B location.

Figure 2:
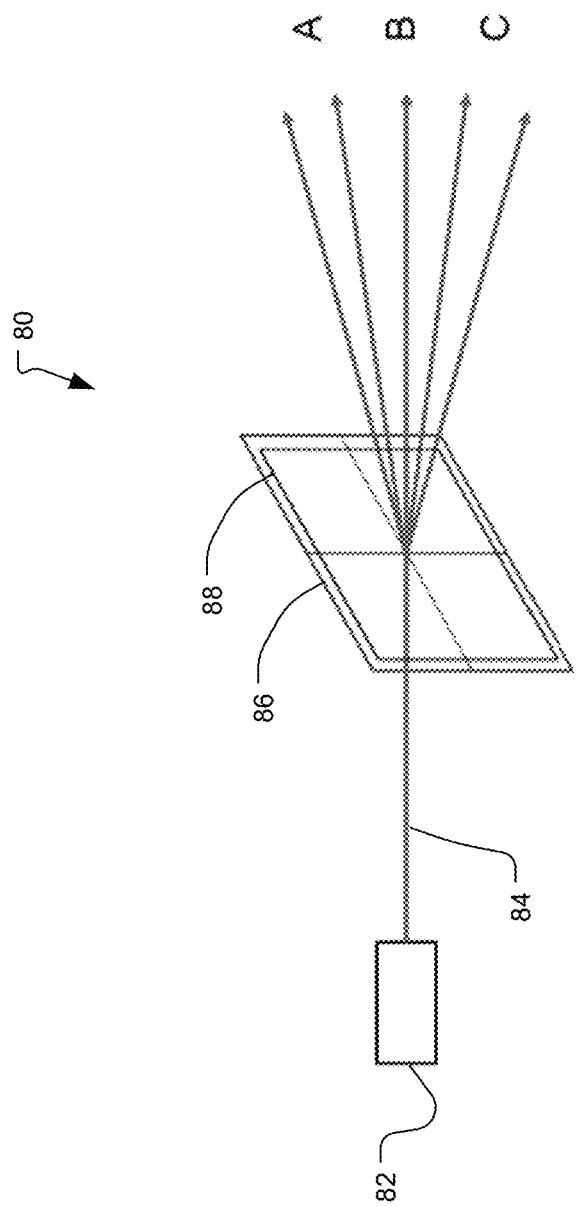
FIG. 2 is a schematic perspective view showing the operation of the diffuser.

FIG. 2 illustrates the operation of a directional diffuser 88 placed at the display surface 86.

Examples of appropriate directional diffusers are the Light Shaping Diffuser (LSD) products from Luminit, Inc. (Torrence, Calif.), for example. A LSD sheet with an elliptical angle of 30×1 or 1×40, with the major axis aligned in this instance parallel to the vertical axis. This allows an observer to see light passing through the display surface 86 for a broad range of eye elevations.

Figure 3:
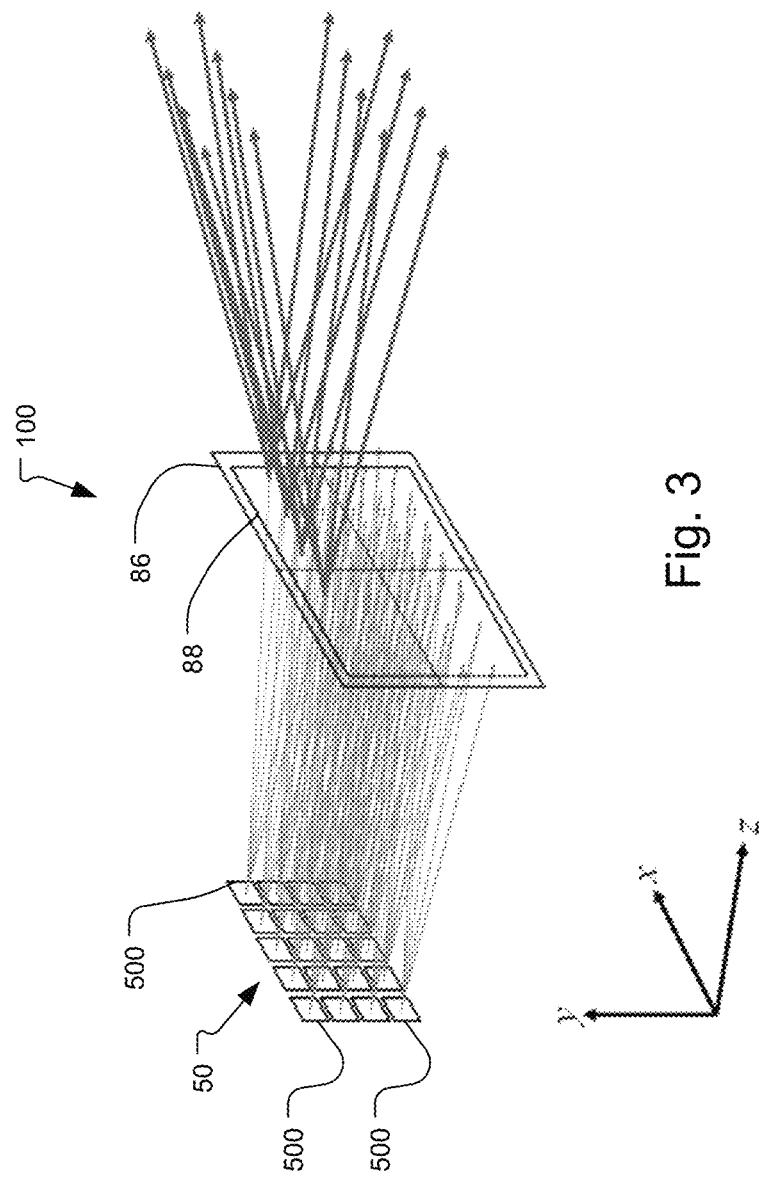
FIG. 3 is a schematic perspective view showing the operation of a horizontal parallax only (HPO) light field projection system including a diffuser for the two dimensional emitter array.

FIG. 3 illustrates the use of a directional diffuser in an HPO electro-holography system 100. The effect of the diffuser 88 is shown for a portion of the system 100.

The exemplary system 100 includes a two dimensional emitter array, or less typically, the image of a raster-scanned group of emitters. In the illustrated example, this two dimensional emitter array 50 is constructed from smaller emitter subarrays 500. The emitter array 50 projects light having a broad horizontal extent but very limited vertical extent. Without a directional diffuser 88 at the display plane 86, an observer would only perceive a small number of image rows at a time. However, placing the directional diffuser 88 at the display plane 86 greatly increases the vertical visibility of the image, while preserving the horizontal perspective information. That is: up-down head movement does not provide "look-around," but left-right head movement does provide "look-around."

The diffuser, however, detrimentally impacts performance due to idiosyncrasies of SAW modulators, for example. Some electro-holographic light projection systems, such as systems employing leaky-mode SAW devices, transmit stray light along directions in addition to the desired directions.

FIG. 4 shows an example of the light emitted from an individual SAW modulator emitter 352.

In this example, a SAW modulator projects light with controllable amplitudes in the x-z plane (i.e., rotated about the y-axis) as depicted by solid lines with arrowheads 150. However, in practice, unwanted background illumination is also output by the modulator, principally in the y-z plane. This is depicted by dashed lines 92. More precisely, the unwanted light is light with a nonzero component along the y-axis. FIG. 5A shows multiple stacked SAW modulator emitters 352. The perceptual impact of the directional diffuser 88 at the display plane 86 on the stray light 92 emitted by each column of emitters 352 is compounded undesirably.

Figure 5B:
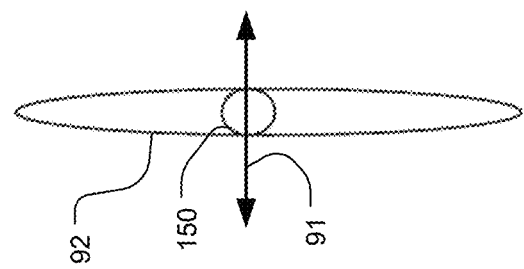
FIG. 5B is a front view showing an emitter or pixel and a halo of background or stray light.
Figure 5A:
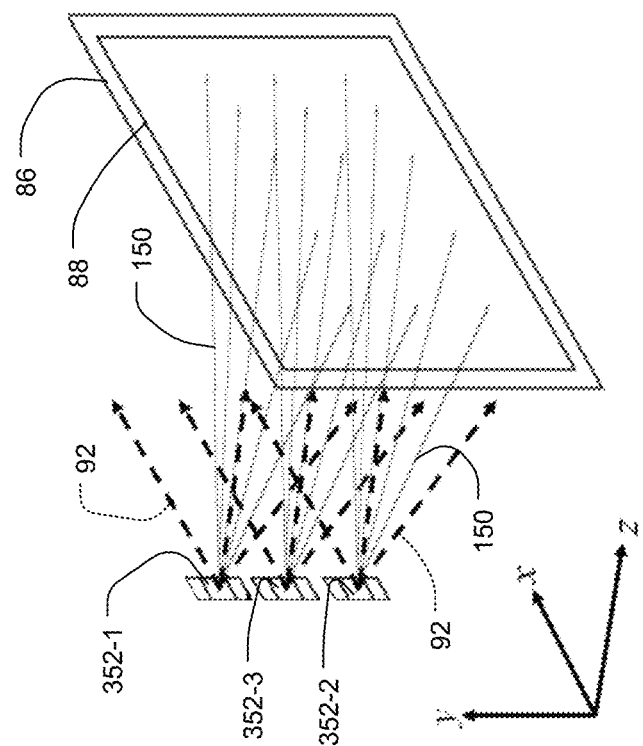
FIG. 5A is a schematic perspective view showing multiple stacked SAW emitters.

FIG. 5B shows the case where a single emitter/pixel is controlled to project a single output foreground light ray 150. But, in its emitter pixel column, the SAW modulator will also emit background or stray light 92. Thus, an observer will perceive an oblong vertically oriented glow 92 along the y-axis direction, with the single intentional spot 150 visible.

The reason for the low contrast imagery is that light impinges upon the directional diffuser 88 from directions not only due to the "intended ray" 150.

The proposed solution involves placing a directionally-sensitive optical element 610 such as one or more structures to obstruct the unwanted light. Typically, the element would be a grille or a series of bars oriented horizontally (parallel to the x-axis) and having sufficient extent along the z-axis as to block light from unwanted angles.

Figure 6B:
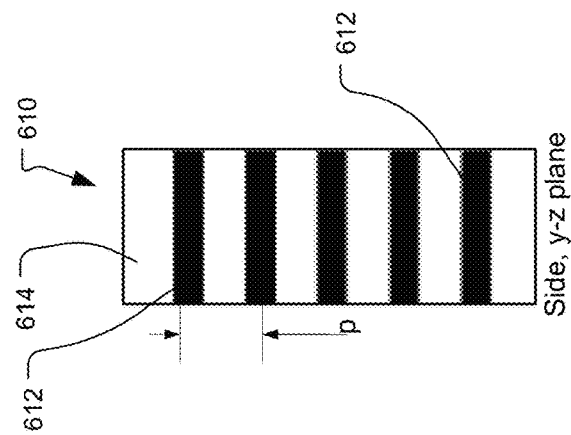
FIGS. 6A and 6B are a front view and side cross-sectional view, respectively, of a directionally-sensitive optical element.
Figure 6A:
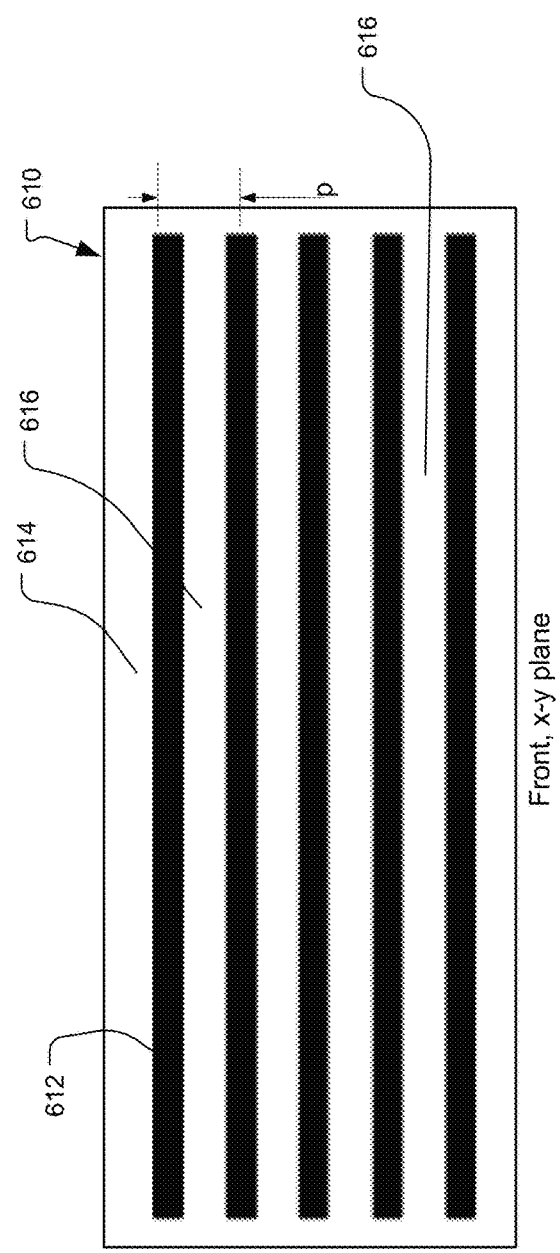

FIGS. 6A and 6B show one example of the directionally-sensitive optical element 610. Foreground signals are passed by the apertures in the grille and background signals are significantly blocked by the bars prior to impinging upon the subsequent directional diffuser display screen. In this way, it functions as a single axis collimating element or a single axis shadow mask element to block stray light along the y-axis direction relative to each pixel of the display and in this way mask stray light from the diffuser.

Typically, the aperture grille 610 would have a series of transmissive horizontal apertures 612. These apertures could be regions of transmissive material or ports through a non-transmissive substrate 614 with bars 616 of the substrate 614 separating the apertures 612. The vertical pitch p of the apertures 612 matches the vertical pitch of the emitters or pixels 352.

In general, the pitch p can take a range of dimensions. For some systems 100, the pitch would be about 1 millimeter (mm), but it could be tighter such as less than 1 mm, such as 100 micrometers or less. Nevertheless, in other systems, the pitch is larger such as 10 centimeters or larger.

On the other hand, in the case of a "vertical parallax-only" system, the apertures 612 would be aligned vertically rather than horizontally.

There are a number of possible ways of forming the apertures 612 in the grille substrate 614. The apertures 612 might be cut from a block of material, such as laser-cut metal, plastic, or wood, or could be a repurposing of "privacy screen filters" such as microlouver material from 3M Corporation rotated 90 degrees from the axis from its traditional orientation about the z-axis.

As a further alternative, any structure with angle-sensitive properties could be used, such as arrays of diffractive optical elements that selectively transmits light that impinges upon it from a preferential angle.

Alternatively, the directionally-sensitive optical element 610 could be operated in a reflective rather than transmissive arrangement, in which the diffuser or the aperture grille is reflective. Alternatively, the functions of elliptical diffusion and angle-selectivity can be combined into one structure. The aperture array could be at any intermediate position between the emitters and the display surface, such as abutting the emitters, in between the emitters and directional diffuser, or immediately prior to the directional diffuser.

The aperture grille 614 could be subtractively (i.e. cut from a block) or additively (e.g. from a stack of thin slotted plates) manufactured.

Or, the aperture array function could be performed by a holographic optical element that preferentially transmits illumination approaching it from the desired locations and absorbs or reflects incident light coming from other locations, similar to "dark screen" projection surfaces.

In the preferred embodiment, the apertures are baffled in the z-axis direction. That is, the inner surfaces of the bars 616 that define the apertures 612 have surface features that facilitate the absorption or reflection of the background light out of the view of the viewers.

Figure 6C:
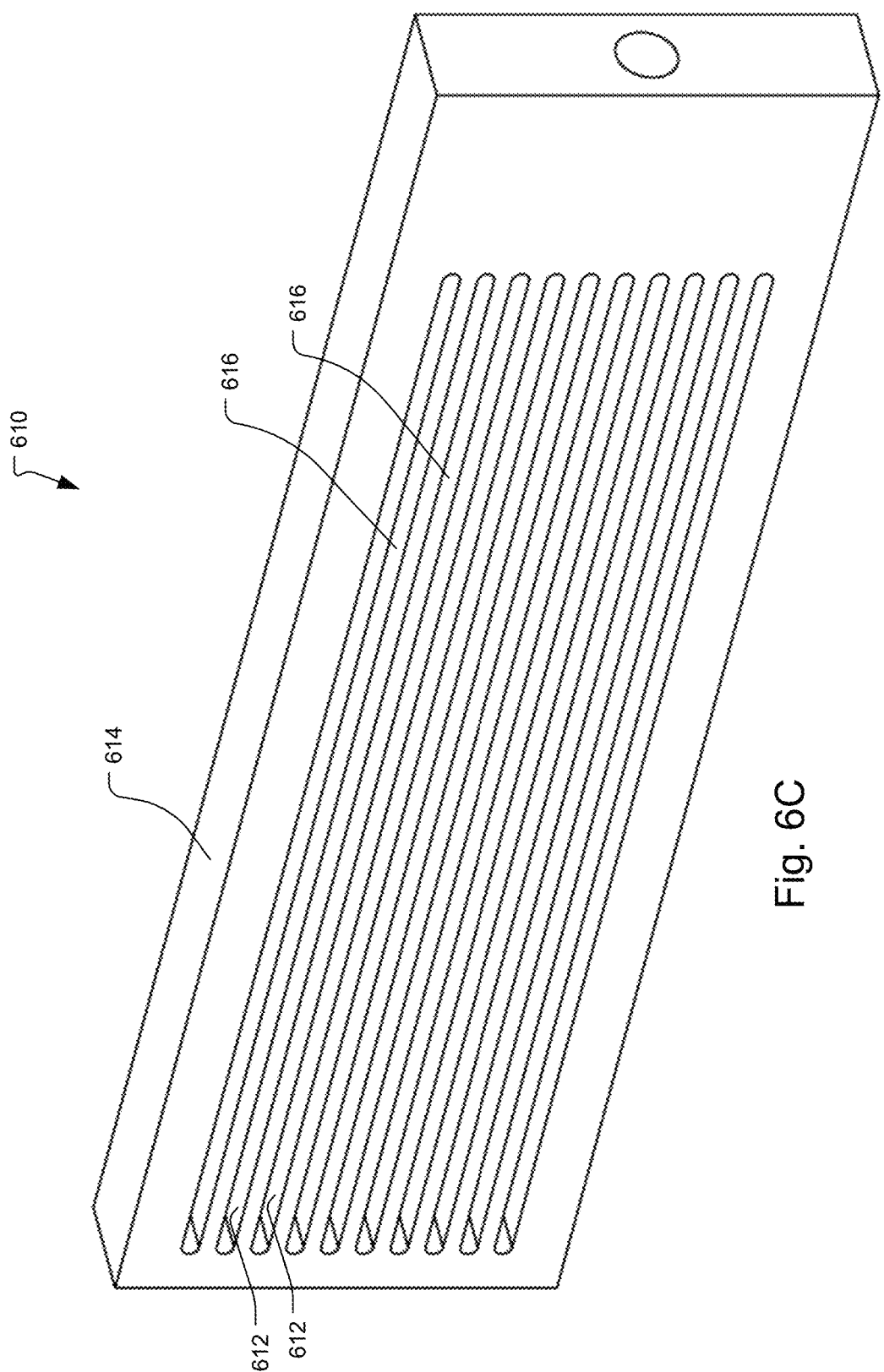
FIG. 6C is a perspective view of a grille directionally-sensitive optical element.

FIG. 6C shows another specific embodiment of the aperture grille 610. This version has 10 horizontal apertures 612.

Figure 7C:
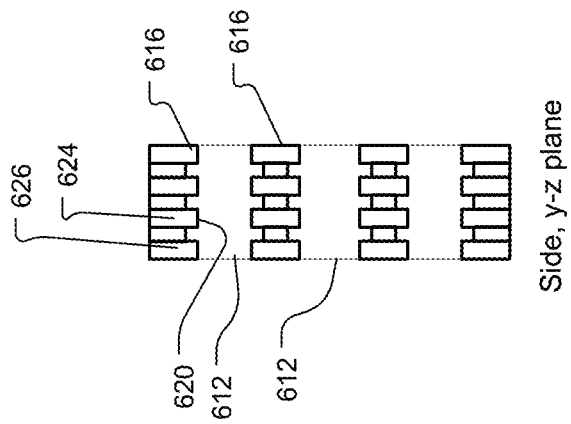
FIGS. 7A, 7B, and 7C are side cross-sectional views showing different surface features 620 for the inner walls of the bars of the grille.
Figure 7B:
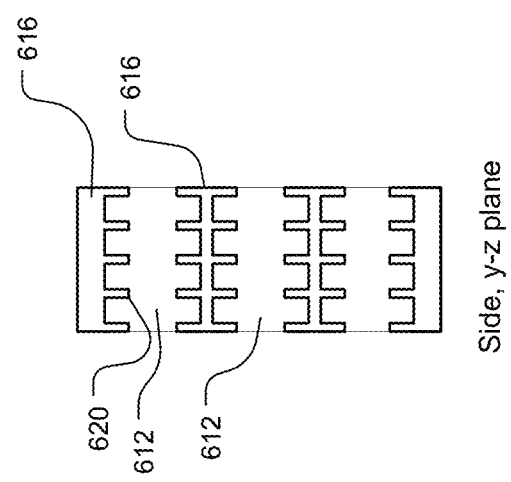
Figure 7A:
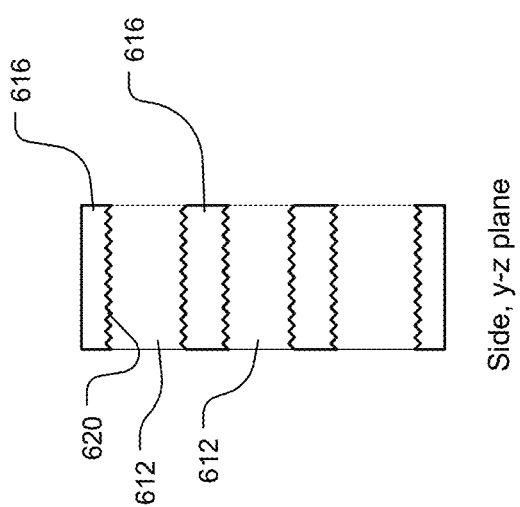

FIGS. 7A, 7B, and 7C show different surface features 620 for achieving this goal.

FIG. 7A shows saw-tooth features 620 on the inner walls of the bars 616.

FIG. 7B shows wall-shaped features 620 on the inner walls of the bars 616.

FIG. 7C shows wall-shaped features 620 on the inner walls of the bars 616, which are created by stacking successive grilles 624, 626 of varying apertures sizes but with a common aperture pitch.

Figure 15:
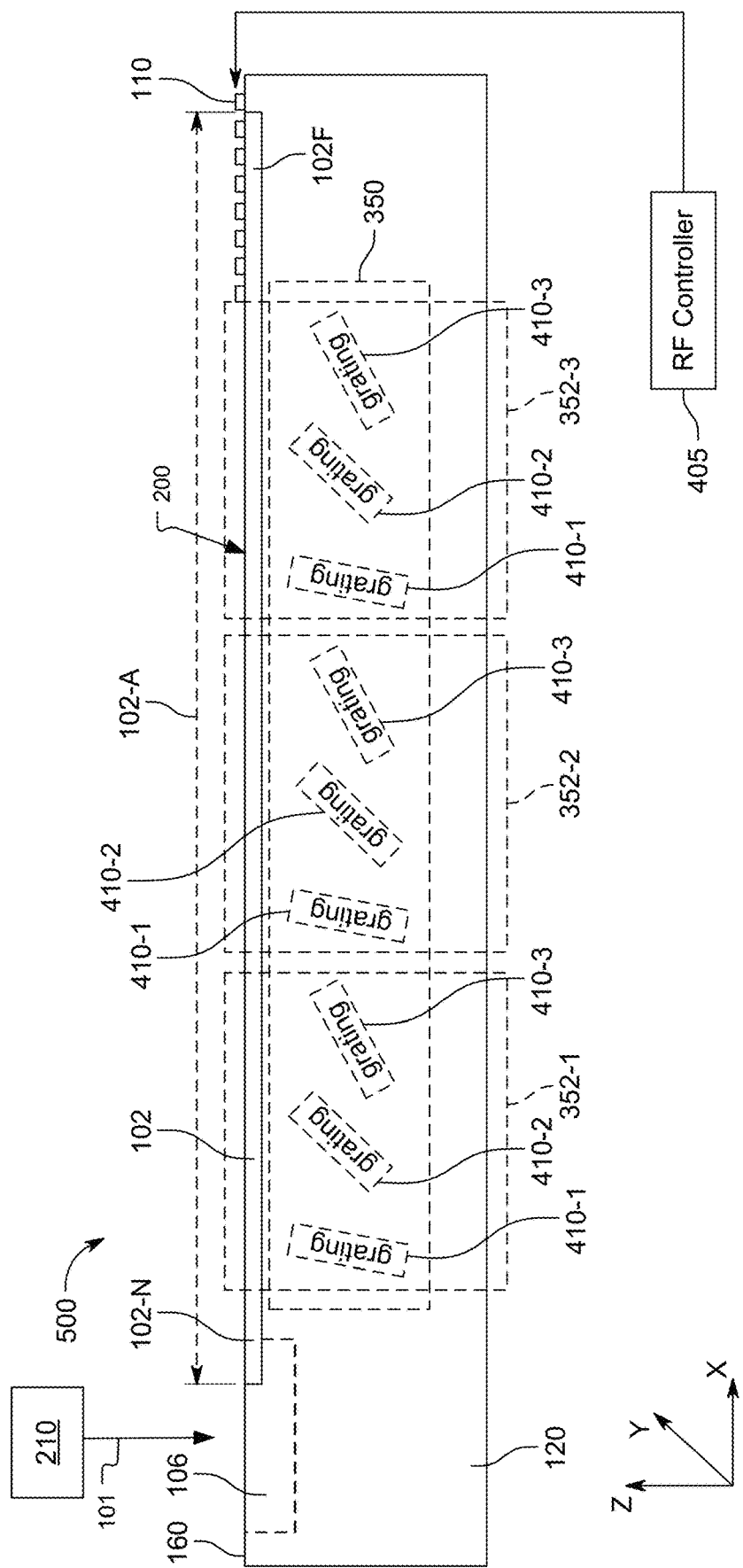
FIG. 15 is a side cross-section showing the details of a face-fire or surface emitting SAW modulator to which the invention might be applied.
Figure 16:
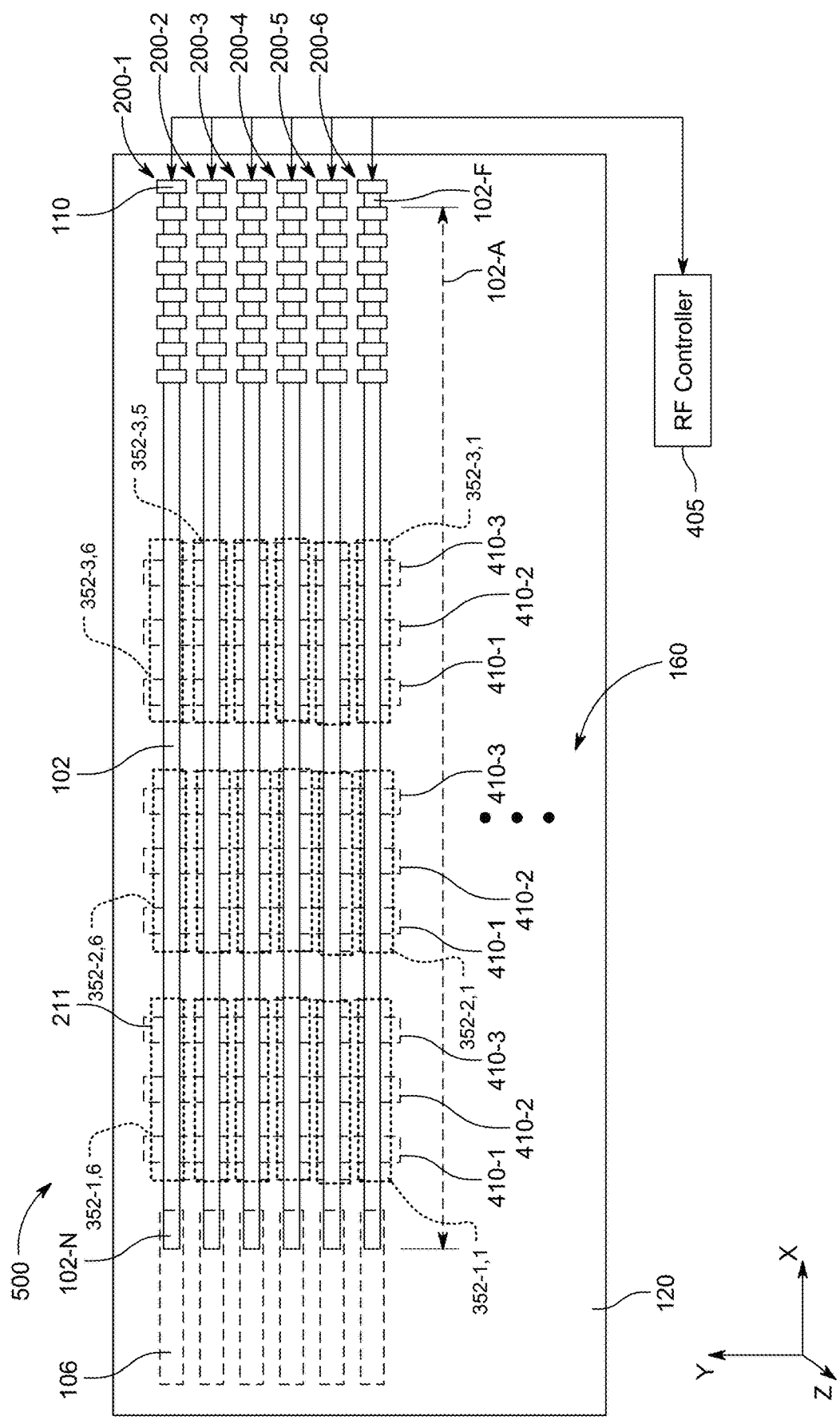
FIG. 16 shows a top view of an electro-holographic light field generator device 500 integrating arrays of the SAW modulators of FIG. 15.

There are a couple of strategies for implementing the two dimensional emitter array 50 and specifically the emitter subarrays 500 using current leaky-mode SAW devices. In the following discussion, FIGS. 8-14 cover some rather detailed designs involving edge-fire or edge-emitting SAW devices. In contrast, FIGS. 15 and 16 show an emitter subarray employing face-fire or surface-emitting SAW devices.

Figure 8:
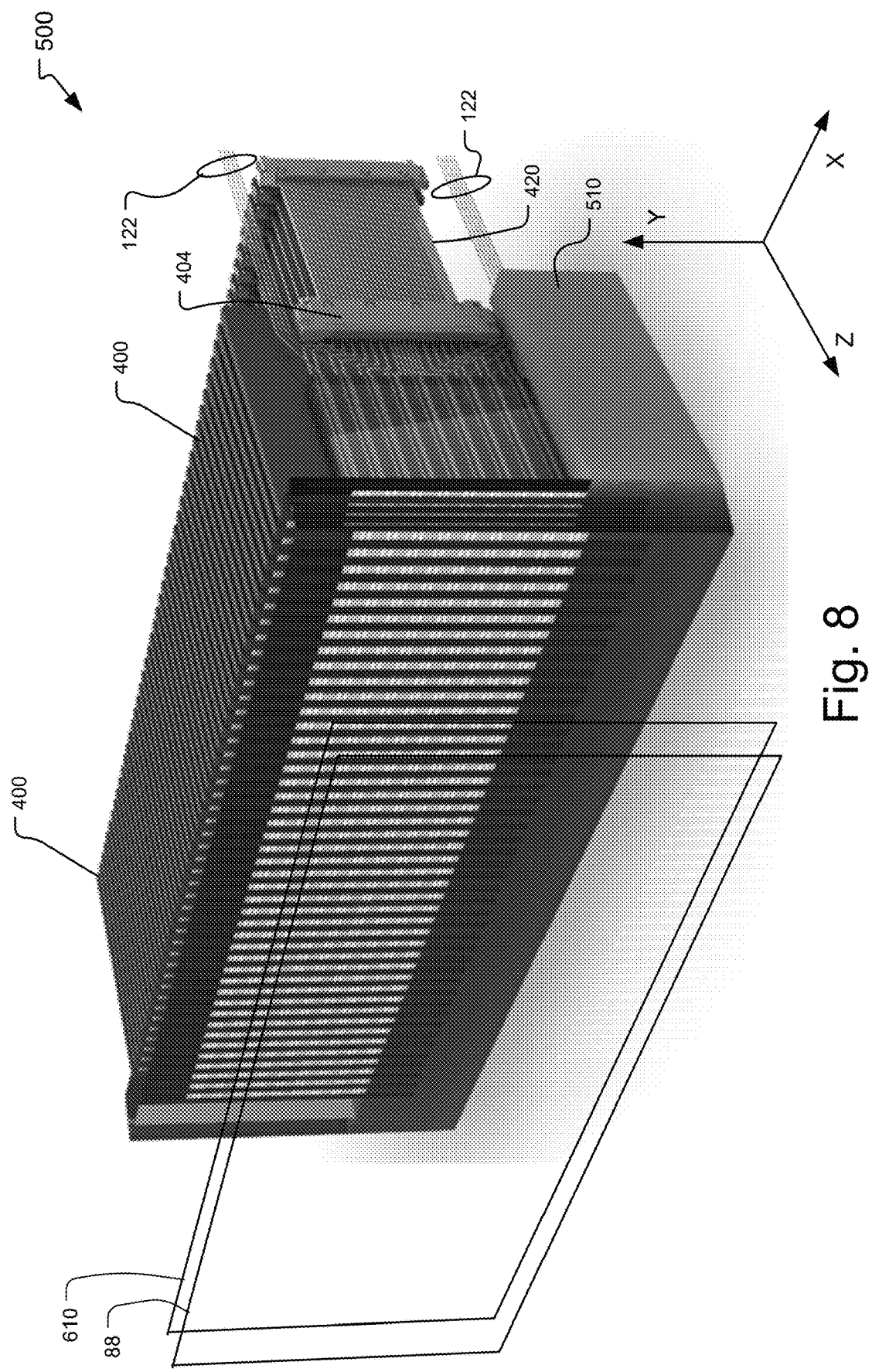
FIG. 8 is a perspective view of a projector subsystem with a stack of edge-emitting projector modules to which the invention might be applied.

FIG. 8 shows a subassembly for creating an emitter subarray 500. This subassembly including a stack of projector modules 400 as an example of a HPO light field generator that employs the directionally-sensitive optical element 610 before the diffuser 88 to improve image contrast.

Here, modules 400 are held vertically by a common system mounting block 510. Specifically, 44 slots are provided in the mounting block 510 in the illustrated embodiment. Each of these slots receives a separate projector module 400.

Figure 9:
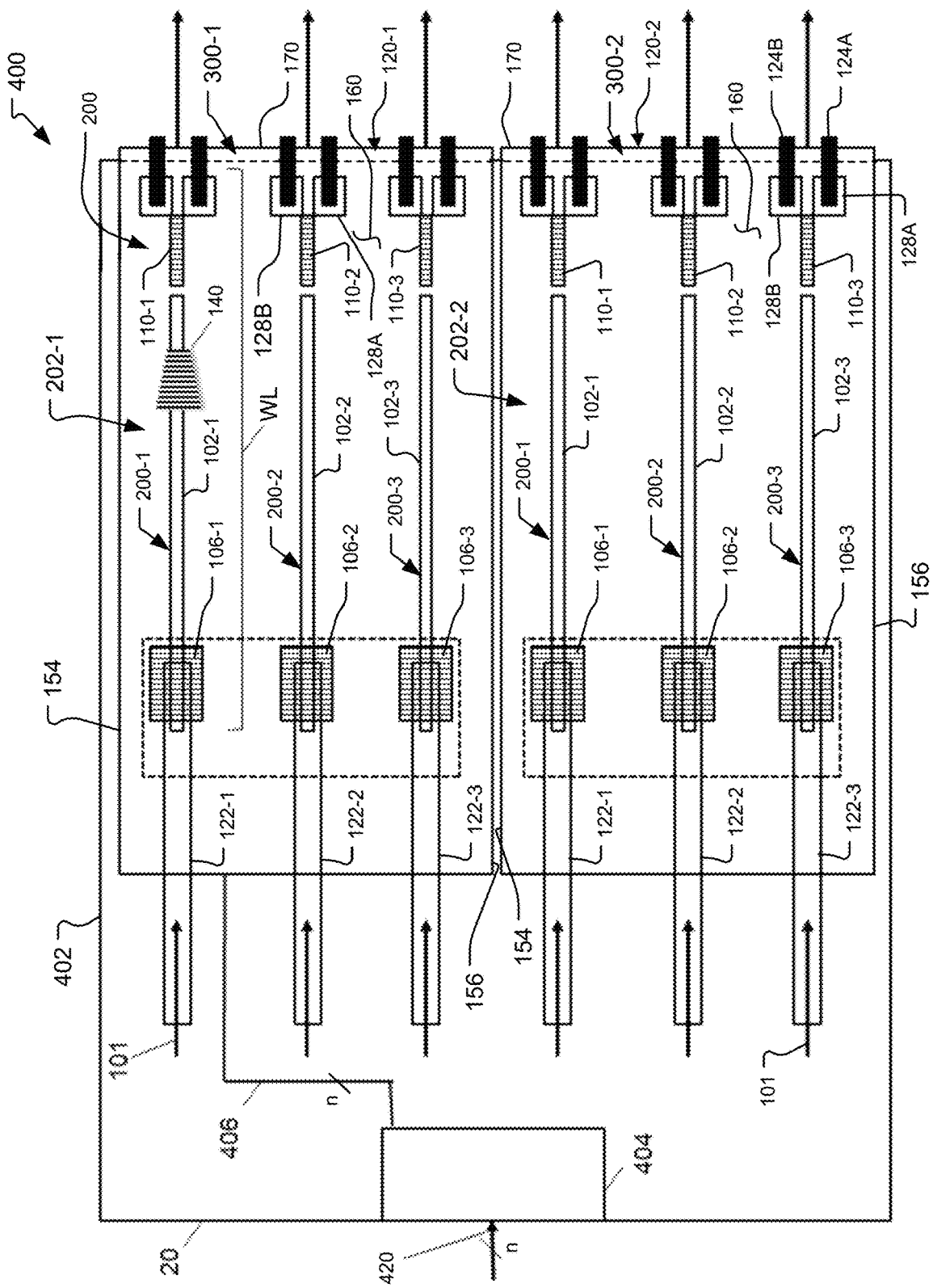
FIG. 9 shows a proximal face of a projector module including two edge-emitting light field generator devices.

FIG. 9 shows a plan view of one of the projector modules 400.

In the illustrated embodiment, the projector module 400 includes two electro-holographic light field generator devices 300-1 and 300-2. They are located in the projector module 400 side by side with their proximal faces 160 extending parallel to the plane of the figure.

The two electro-holographic light field generator devices 300-1, 300-2 are mounted to a common module board 402 of the projector module 400. A module RF connector 404 is installed on the module board 402 and interfaces with a ribbon umbilical cable 420 that provides one or more RF drive signals. At the common module board 402, the module RF connector 404 then distributes the RF drive signals via an RF feed line network 406.

Each electro-holographic light field generator device 300-1, 300-2 comprises an array 202 of edge emitting SAW devices or modulators 200. The SAW devices 200 are fabricated in piezoelectric, crystalline, SAW substrates 120-1 and 120-2, respectively. The longitudinal axes of each of these SAW devices 200 extend parallel to each other, across each light field generator device 300. In the specific illustrated embodiment, each light field generator device 300-1, 300-2 includes an array 202 of three (3) SAW devices 200-1, 200-2, 200-3.

Of course, in other embodiments, usually larger numbers of SAW devices 200 are provided in each light field generator device 300 and/or in each SAW substrate 120. In a preferred embodiment, there are at least ten (10) such SAW devices 200 per each light field generator device 300/SAW substrate 120.

Each SAW substrate 120 may be made, for example, of lithium niobate. In the current embodiment, the SAW substrates 120 are x-cut, y-propagating, measuring 5 millimeters (mm) (in the direction of the waveguides 102)×10 mm (in a direction perpendicular to the waveguides 102, but in the plane of the figure)×1 mm (substrate 120 thickness). Many other materials and design choices are available, however, including other piezoelectric materials and crystallographic orientations, and waveguide architectures such as planar, ridge, rib, embedded, immersed, and bulged. Doping such as MgO-doped lithium niobate may be useful, in some cases.

Each SAW optical modulator 200 includes an in-coupling device 106 (e.g., in-coupling grating or prism), a waveguide 102 and a SAW transducer 110 (e.g., an interdigital transducer or IDT, for example).

In the illustrated embodiment, the in-coupling device 106 of each SAW modulator 200 is an in-coupling grating. The grating receives input light 101 carried by an optical fiber pigtail 122 that terminates above the respective grating 106.

There are other ways to couple light into the waveguides 102 of the substrates 120, however. These include butt-coupling to the pigtails 122, free-space illumination, and fiber or free-space coupling into an in-coupling prism.

In a typical design, the waveguides 102 provide confinement of the input light in a TE (transverse electric, E-field in the plane of the device) guided mode. In a current embodiment, the waveguide 102 is 100 micrometers wide (in the plane of the figure) and 1 micrometer thick (perpendicular to the plane of the figure).

The SAW transducers 110 are driven by an RF input signal that creates a corresponding surface acoustic wave 140. The surface acoustic wave 140 counter-propagates collinearly with the light in the waveguide 102. The SAW interacts with the light, both near the proximal face 160, to convert or diffract part of the light to a transverse magnetic (TM) polarization, leaky mode.

Here, the SAW transducers are interdigital transducers that are approximately 1 mm long (i.e., in the direction of the waveguide 102) and have features on the order of 1-3 micrometers. IDT pads 128A, 128B are each roughly 300 micrometers×300 micrometers.

Birefringence of the waveguide 102 and the SAW substrate 120 causes the TM leaky mode portion of the light propagating in the waveguide 102 to leak out of the waveguide 102 into the SAW substrate 120. The leaky mode portion of the light enters the substrate 120 as diffracted light 162, which travels within the substrate 120 towards an exit face. Here, the exit face is an end face 170 of each SAW substrate 120 of each light field generator device 300-1, 300-2.

In different embodiments, the IDT 110 can occupy a variety of specific locations and specific orientations with respect to the waveguides 102. For example, in the illustrated embodiment, the transducers 110 are located near the end face 170 so that the surface acoustic waves 140 will propagate in a direction opposite the propagation of the light in the waveguides 102. In other embodiments, however, the transducers 110 are located near the in-coupling devices 106 so that the surface acoustic waves 140 will co-propagate in the direction of the light in the waveguides 102.

Also, there could be multiple SAW transducers 110 for each in-coupling device 106/waveguide 102. In such an implementation, each SAW transducer 110 might be responsible for a different specific bandwidth around a given center frequency (e.g.: 100-200 MHz, 200-300 MHz, and 300-400 MHz).

In a specific embodiment, the array 202 of SAW optical modulators 200 may be packed relatively tightly with a waveguide separation 206 of between 10 μm-400 μm, for example, 50 μm. The waveguide length WL may be less than a centimeter to several centimeters (e.g., 1 cm) long.

FIG. 10 shows a side view of an exemplary projector module 400. It is also illustrative of the operation of an exemplary SAW modulator 200 of the light field generator device 300. It shows side facets 156 of the SAW substrate 120.

In terms of the SAW modulator operation, the input light signal 101 is carried to the device via the optical fiber pigtail 122. In the illustrated embodiment, end 122-E of the optical fiber pigtail 122 is polished at an angle and preferably metallized or coated with another reflective coating. Thus, the optical signal 101 transmitted by the pigtail 122 is reflected at the end 122-E toward the in-coupling grating 106 of the SAW modulator device 200. As a result, the optical signal is coupled into the waveguide 102 via the grating 106.

In some examples, the optical fiber pigtails 122 are arranged on and bonded to the surface of the substrate 120. In other cases, the pigtails are placed such that they lie on or within trenches formed into the proximal face 160 of the SAW substrate 120.

At the other end of the SAW modulator device 200, the IDT 110 generates the surface acoustic wave 140 that counter propagates with the light in the waveguide 102. When they interact, see point I, the surface acoustic wave 140 diffracts the optical signal 101 to create diffracted light 162 that leaks out of the waveguide 102.

In the illustrated embodiment, the diffracted light 162 exits the substrate 120 via end face 170 as the exit face. An edge cut angle β (beta) of the end face 170 is also shown. The edge cut angle β is measured from a plane 126 of the proximal face 160, to the end face 170. The edge cut angle β is preferably about 100 to 140°, or about 120°. As a result, when the diffracted light 162 exits the substrate 120 into air, for example, the edge cut angle β in combination with the refraction at this interface causes the exit light 150 to propagate in a direction that is generally parallel to the longitudinal axes of the SAW devices 200 and parallel to the plane 126 of the proximal faces 160 of those devices 200.

Exit optics are typically further used. Their purpose includes angle magnification, polarization, and elliptical diffusing. The optics can be separate from the substrate 120 or fabricated on the end face 170, in examples.

In terms of the construction of the projector module 400, the SAW substrate 120 is attached to a top face 412 of the module board 402. In the illustrated implementation, the rear end of the substrate 120 can be separated from the top face 412 of the module board 402 via an optional rear standoff block 408. On the other hand, the front end of the substrate 120 is separated from the top face 412 of the module board 402 via a series of front conductive blocks or pads 410.

In addition to supporting the front end of the substrate 120, the front conductive blocks 410A, 410B are also utilized in the delivery of the RF signals to the IDTs 110 of the SAW devices 200. In more detail, the RF signals from the RF connector 404 are routed over the top face 412 or through layers of the module board 402 in the RF feed line network 406 of the module board 402 and to the front standoff blocks 410, which are electrically conducting. Pairs of conformal RF traces 124A and 124B electrically connect to respective front standoff blocks 410A, 410B. The conformal RF traces 124A and 124B then extend forward, on the distal face 168 of substrate 120 and then wrap around the edge to the end face 170, and extend over the end face 170 to the proximal face 160. On the proximal face, the conformal RF traces 124A, 124B run rearward to make contact with respective IDT bond pads 128A, 128B that connect with the IDT 110.

FIG. 11 shows a front view of the projector module 400. It best illustrates how each SAW device 200-1, 200-2, 200-3 of the SAW substrate 120 has a pair of conformal RF traces 124A, 124B that wrap-around the end face 170 to carry the RF signal for each IDT 110 from the respective front conductive blocks 410A, 410B on the bottom of the substrate 120 to the IDT 110 on the top of the substrate 120. The emitters or pixels 352-1, 352-2, 352-2 for the SAW device 200-1, 200-2, 200-3 are located in the gap between the RF traces 124A, 124B of the respective device.

Figure 12A:
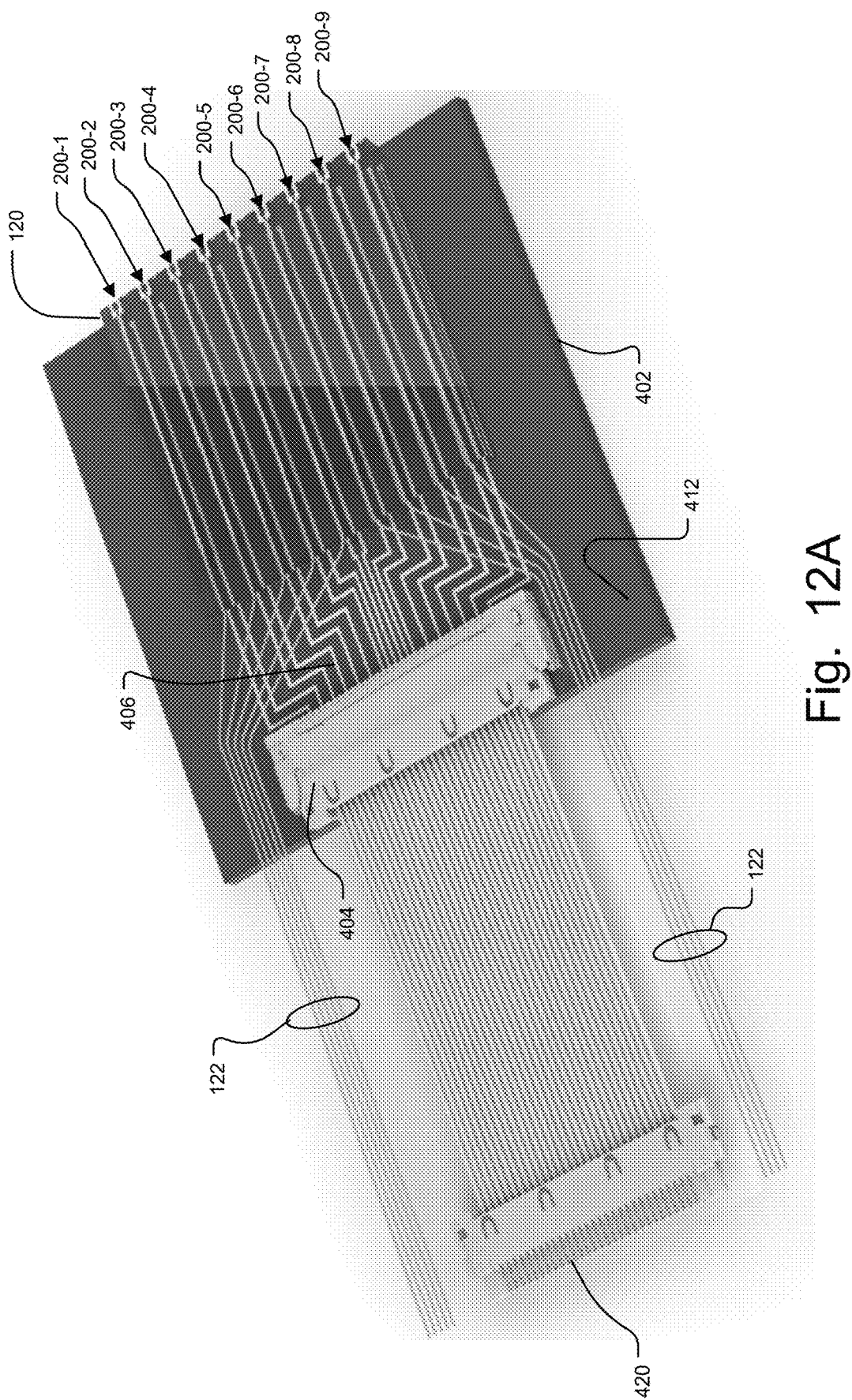
FIGS. 12A and 12B are a perspective view and an exploded perspective view of a projector module according to a related example.
Figure 12B:
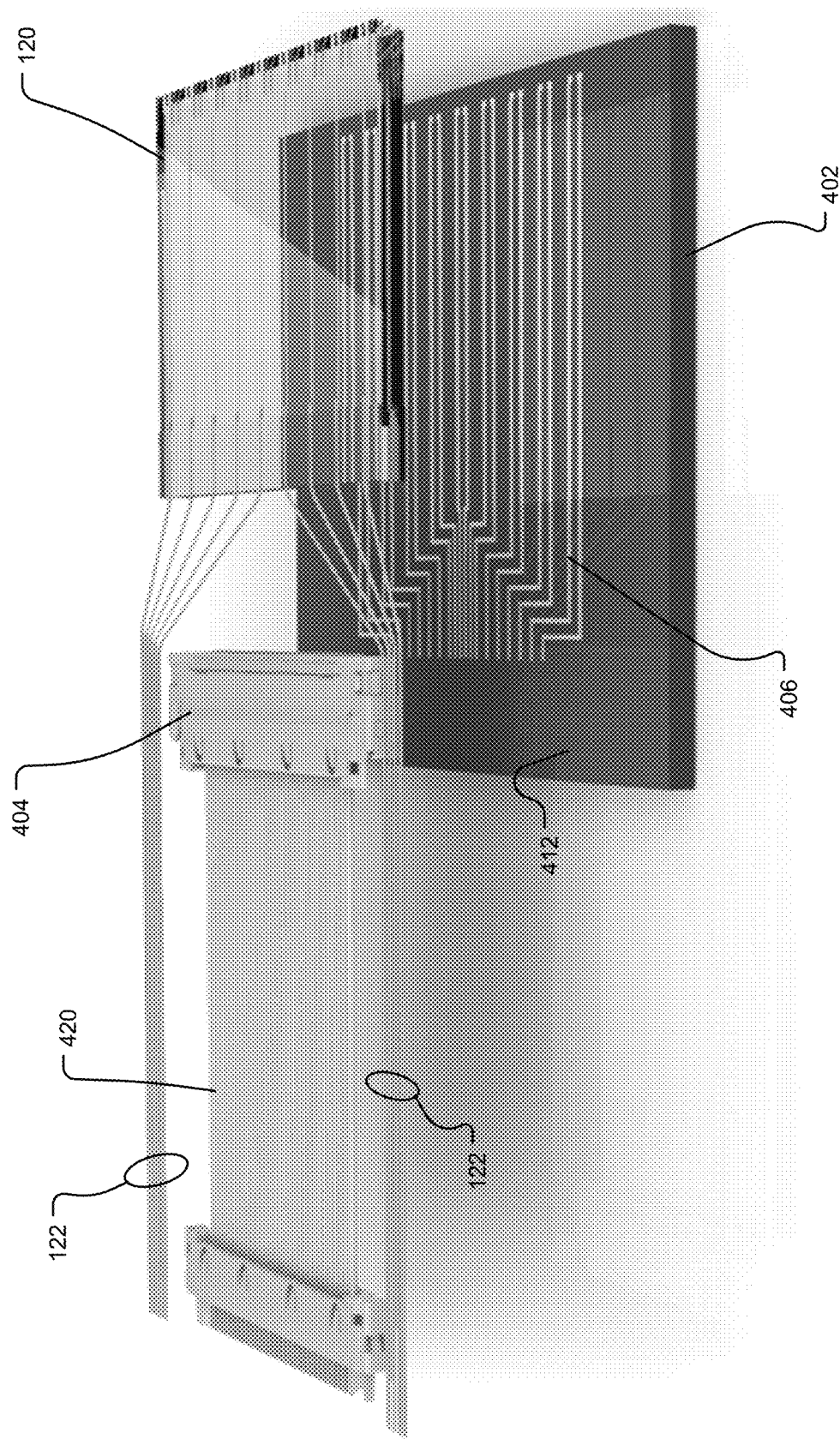

FIGS. 12A and 12B show a related embodiment of the projector module 400. It is generally similar to the projector module described with respect to FIGS. 1-3, but differs in a few ways.

Here, a single SAW substrate 120 is attached to the top of the module board 402, rather than two as depicted in FIG. 1. The substrate, however, is more highly integrated. It includes nine (9) SAW modulator devices 200-1 to 200-9.

More details are shown concerning the RF feed line network 406. The feedlines include an array of traces that run on or through the board and carry separate RF signals. In this way, the module board 402 has an array of RF feed lines 406 for providing RF signals to the substrates.

Also shown is a specific implementation of the module RF connector 404. A ribbon umbilical cable 420 plugs into a ribbon-style connector 404 as the module RF connector. The connector 404 is attached to the top face 412 of the module board 402.

The optical fibers 122 run into groups and connect to provide the optical signals to the separate SAW devices 200.

In other embodiments, however, the ribbon-style connector 404 is replaced with Pogo pins, press-fit, conductive adhesives, wire-bonding, or ZEBRA-brand (Fuji Polymer Industries) elastomeric connectors.

Figure 13:
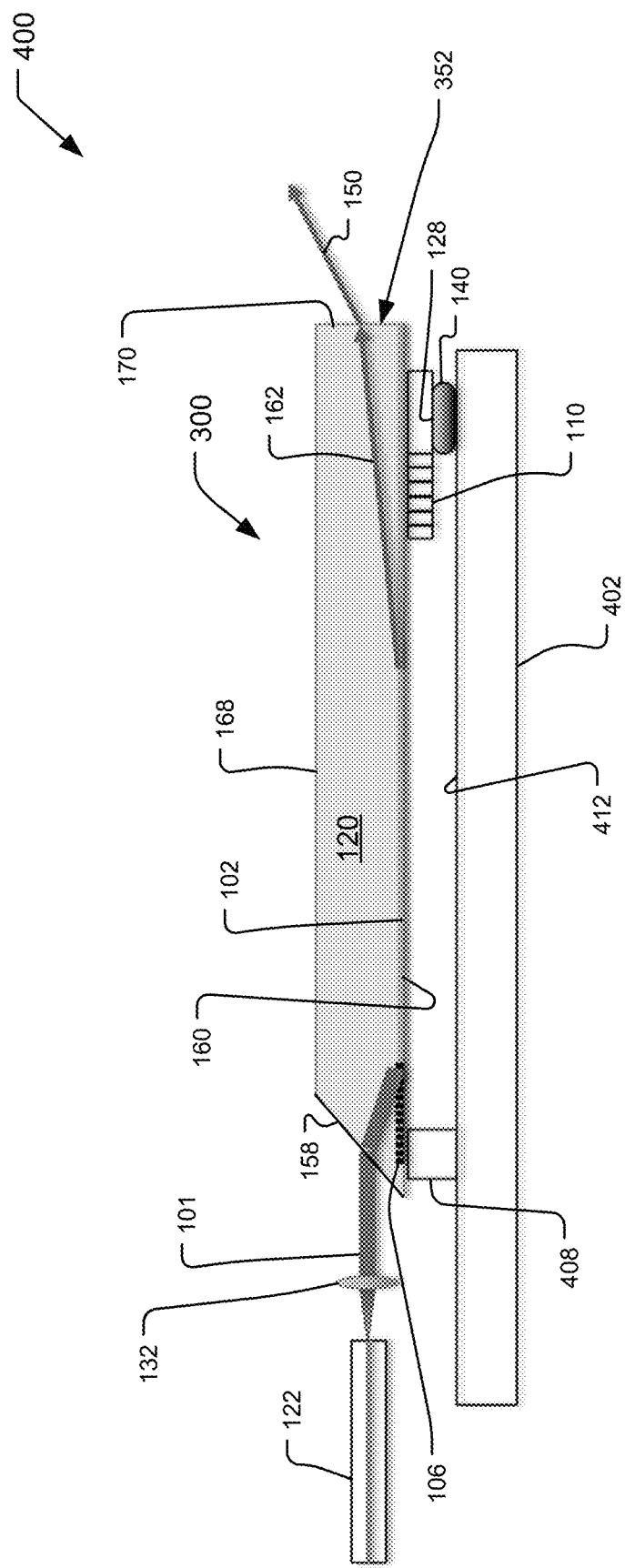
FIG. 13 is a side view of another exemplary projector module 400.

FIG. 13 shows a side view of another exemplary edge-emitting projector module 400.

This embodiment removes the need for conductive traces printed on the lithium niobate SAW substrate 120. The light field generator device 300 is installed with its proximal face 160 facing the module board 402. That is, the surface of the light field generator device 300 with waveguides 102, in-coupling devices 106, and IDTs 110 face the top face 412 of the module PCB 402.

Solder balls or conductive epoxy are used as the conductive blocks 410 to make contact between the IDT bond pads 128 and pads on the module board 402. Additionally, micropearls can be an alternative to solder balls.

In general, by controlling the tin-lead content of the solder balls, the reflow temperature can be tuned. This can be used to keep the solder balls more spherical to provide a desired standoff distance.

Input light 101 from optical fiber 122 is preferably fed through an end facet polished into the input end face 158 of the SAW substrate 120. One option is to use a collimated beam produced by sending the light 101 from the fiber 122 through a collimating optic 132. The input beam can be adjusted to the correct angle to couple into the waveguide 102 via the in-coupling grating 106 by angling the input end face 158 of the SAW substrate 120.

Rear standoff block 408 between the SAW substrate 120 and module PCB 402 ensure that the IDTs 110 and in-coupling grating 106 remain undamaged and that the SAW propagation in the waveguide 102 is not impeded by close contact of the PCB 402 and substrate 120.

Figure 14:
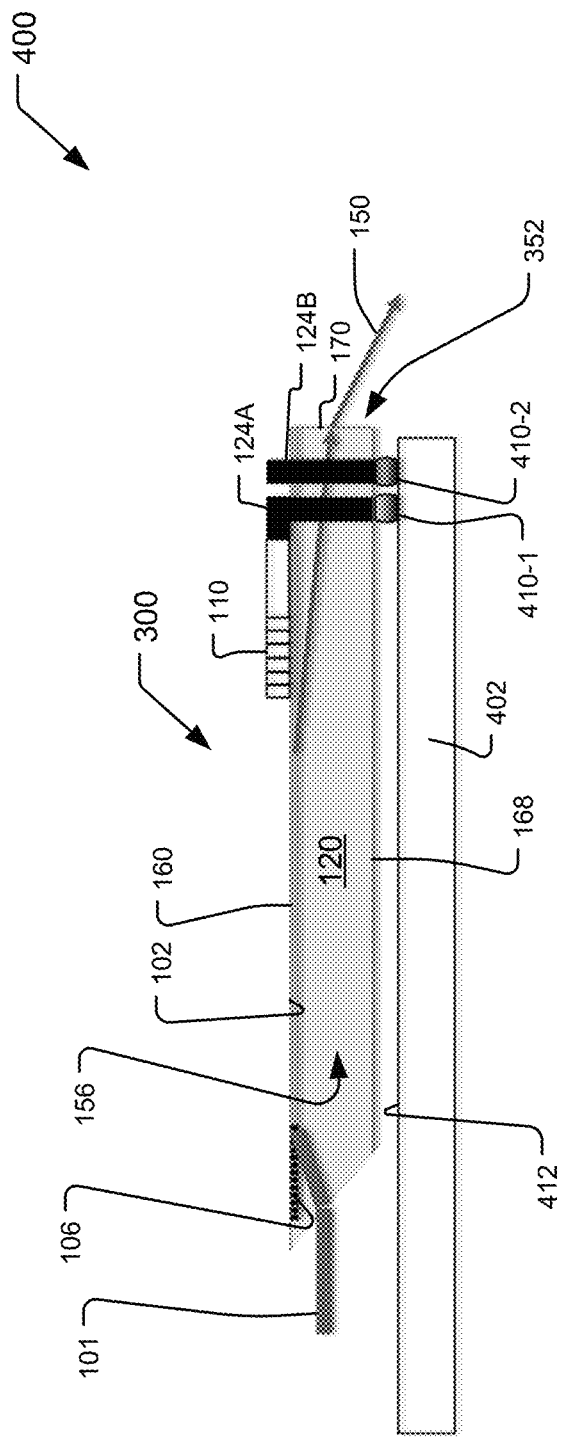
FIG. 14 is a side view of another exemplary projector module 400.

FIG. 14 shows a side view of another exemplary projector module 400.

Here, the RF traces 124A, 124B run on the side facets 154, 156 of the SAW substrate 120. These conductive traces can then be printed down both of the side facets 154, 156 of the SAW substrate 120 to extend directly to conductive blocks 410A, 410B on the module PCB 402.

FIG. 15 shows a side cross-section showing the details of a face-fire or surface emitting SAW modulator and FIG. 16 shows top views of an electro-holographic light field generator device integrating arrays of the SAW modulators of FIG. 15 to create an emitter subarray 500 using surface-emitting SAW devices.

SAW substrate 120 has a proximal face 160 across which an array of optical modulators 200-1 to 200-6 are distributed. (In the illustrated embodiments, six explicit modulators 200 are shown in the view of FIG. 16. (It should be noted, however, that in practice, especially for commercial devices, the optical substrate 120 will contain tens to hundreds, or more, of these modulators 100.)

As shown in FIG. 15, each optical modulator 200 includes a waveguide 102 having opposing waveguide ends 102-N and 102-F, with respect to a longitudinal waveguide axis 102-A. At the near waveguide end 102-N, there is a light in-coupling device 106. At the far waveguide end 102-F, there is one or more surface acoustic wave (SAW) transducers 110. Usually the transducers are IDTs. Ordinarily, the number of IDTs per waveguide is small: usually just 1, or possibly more such as 2-5 IDTs per waveguide. Additional IDTs are helpful in designs requiring high bandwidth operation, focusing of the diffracted light, and/or deflection along another axis. A typical IDT has 50-100 fingers in it, about 1-2 micrometers wide per finger.

The coordinate axes in the figures define the x-axis as the propagation direction of light in the waveguides 102. The proximal face 160 of the substrate 120 is parallel to the x-y plane. The z-axis is perpendicular to the proximal face 160. (Note that the use of coordinate axes herein may differ from the tradition of naming the axes in lithium niobate wafers. References elsewhere, for example, to "x-cut, y-propagating" lithium niobate and the like may be in terms of axes that are defined in different directions than those in the present figures.)

As mentioned before, the optical substrate 120 may be made, for example, of a suitable piezoelectric material such as lithium niobate ($LiNbO_3$), quartz ($SiO_2$), or lithium tantalate ($LiTaO_3$) following known processes. These materials exhibit a birefringence property that allows for the convenient conversion of light into leaky modes and convenient polarization-based filtering of scattered light. Many other materials and design choices are available including other piezoelectric materials and crystallographic orientations, and waveguide architectures such as planar, ridge, rib, embedded, immersed, and bulged. Doping such as MgO-doped lithium niobate may be useful, in some cases. The optical substrate 120 may range in x- or y-dimensions of 1 centimeters (cm) (for near-eye display applications) to over 20 cm (for larger displays at larger viewing distances). Typically, the thickness (z-dimension) of the optical substrate 201 ranges from 0.5 millimeters (mm) to 3 mm.

The light in-coupling device 106 (e.g., an optical grating or prism) couples input light 101 from an illumination source 210 into the waveguide 102 for TE-like (transverse electric) guided mode confinement of the input light within the waveguide 102. In a display application, the input light 101 is likely to be linearly polarized, and may be pulsed or continuous.

The SAW transducer 110 is typically designed such that the SAW will propagate collinear with the waveguide 102, copropagating or counter propagating with the light. Further, the generation of the SAW is timed with the light in the waveguide 102 to interact and convert a portion of that light to transverse magnetic (TM) polarization. Birefringence of the waveguide 120 and the optical substrate 120 (and/or the wave-vector change from the interaction) causes the deflection of a leaky mode fan of light out of the waveguide 102. The device is designed to have a defined output coupling region of the optical substrate 120.

In different embodiments, the SAW transducers 110 can occupy a variety of specific locations and specific orientations with respect to their respective waveguide 102. In the illustrated embodiment, the SAW transducers 110 are located at the opposite, far end 102-F of the waveguides 102 from the in-coupling devices 106. Thus, the SAWs counter-propagate, in a direction opposite the propagation of the light in the waveguides 102. In other examples, however, the SAW transducers 110 can be located proximate to the near end 102-N of the waveguide 102, near the in-coupling devices 106. Then, the SAWs will propagate with the direction of light propagation in the waveguides 102. Moreover, there could be multiple SAW transducers 110 for each waveguide 102, with each SAW transducer 110 responsible for a different specific bandwidth around a given center frequency (e.g., 100-200 MHz, 200-300 MHz, and 300-400 MHz).

For each optical modulator 200-1 to 200-6, there are multiple output couplers 410. In the illustrated embodiment, the output couplers 410 are distributed along the length of the waveguides 102 of the SAW modulators 200. Specifically, the output couplers 410 are divided into different emitters or pixels 352-x,y, that form the emitter subarray 500. The output couplers 410 reflect the leaky mode fan of diffracted light as an output fan out from the optical substrate 120 at different output angles towards a display viewer. Specifically, the three output couplers 410-1, 410-2, 410-3 rotated around the y-axis to be angled at a different angle with respect to the x-axis such that they direct the leaky mode light into a different range of angles with respect to the proximal face 160.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for improving contrast in a light field generation system, comprising:
    projecting light with a two dimensional emitter array;
    blocking stray light with a directionally-sensitive optical element in front of the emitter array; and
    placing a directional diffuser after the directionally-sensitive optical element.

2. A light field generation system, including:
    a two dimensional emitter array for projecting light;
    a directionally-sensitive optical element in front of the emitter array; and
    a directional diffuser after the directionally-sensitive optical element.

3. A light field generation system, including:
    a two dimensional emitter array for projecting light;
    a directionally-sensitive optical element in front of the emitter array; and
    wherein the two dimensional emitter array comprises a two dimensional array of surface acoustic wave (SAW) modulators.

4. A system as claimed in claim 3, wherein the SAW modulators are surface-emitting.

5. A system as claimed in claim 3, wherein the SAW modulators are edge-emitting.

6. A light field generation system, including:
    a two dimensional emitter array for projecting light, wherein each emitter of the two dimensional emitter array projects light with controllable amplitudes in an x-z plane; and
    a directionally-sensitive optical element in front of the emitter array that blocks stray light along a y-axis direction from the emitter array.

7. A system as claimed in claim 6, wherein the directionally-sensitive optical element comprises an aperture grille.

8. A system as claimed in claim 7, wherein a pitch between apertures of the aperture grille matches a pitch between rows of emitters of the emitter array.

9. A system as claimed in claim 6, wherein the directionally-sensitive optical element comprises microlouver material.

10. A system as claimed in claim 6, wherein the directionally-sensitive optical element comprises arrays of diffractive optical elements, a reflective element, or a holographic optical element.

11. A system as claimed in claim 6, wherein the light field generation system is a horizontal parallax only system.

12. A method for improving contrast in a light field generation system, comprising:
    projecting light with a two dimensional emitter array, with each emitter of the two dimensional emitter array projecting light with controllable amplitudes in an x-z plane; and
    blocking stray light along y-axis direction from the emitter array with a directionally-sensitive optical element in front of the emitter array.

13. A method as claimed in claim 12, wherein the light field generation system is a horizontal parallax only system.

14. A method as claimed in claim 12, wherein the two dimensional emitter array comprises a two dimensional array of surface acoustic wave (SAW) modulators.

15. A method as claimed in claim 14, wherein the SAW modulators are edge-emitting.

16. A method as claimed in claim 14, wherein the SAW modulators are surface-emitting.

17. A method as claimed in claim 12, wherein the directionally-sensitive optical element comprises an aperture grille.

18. A method as claimed in claim 17, wherein a pitch between apertures of the aperture grille matches a pitch between rows of emitters of the emitter array.

19. A method as claimed in claim 12, wherein the directionally-sensitive optical element comprises microlouver material.

20. A method as claimed in claim 12, wherein the directionally-sensitive optical element comprises arrays of diffractive optical elements, a reflective element, or a holographic optical element.

* * * * *